C. A. WARD.
COMBINED BUMPER, STEP, AND DASH.
APPLICATION FILED JUNE 11, 1917.

1,284,504.

Patented Nov. 12, 1918.
2 SHEETS—SHEET 2.

Inventor
Charles A. Ward.
By his Attorneys
Newell + Neal

UNITED STATES PATENT OFFICE.

CHARLES A. WARD, OF MOUNT VERNON, NEW YORK.

COMBINED BUMPER, STEP, AND DASH. REISSUED 1,284,504.　　　　　Specification of Letters Patent.　　Patented Nov. 12, 1918.

Application filed June 11, 1917. Serial No. 173,927.

*To all whom it may concern:*

Be it known that I, CHARLES A. WARD, a citizen of the United States, residing at Mt. Vernon, N. Y., have invented certain new and useful Improvements in Combination Bumpers, Steps, and Dashes, of which the following is a clear, full, and exact description.

My invention relates to a combination bumper, step and dash for vehicles, and more especially for automobile delivery trucks.

While my invention is applicable to a wide variety of vehicles, it is more specifically designed for use on the type of auto truck that is used for retail delivery. The driver, or his assistant, on this kind of truck must frequently leave and reënter the vehicle for the purpose of delivering packages or the like. In the trucks now in use, the entrance is from the side and this necessitates either that the portion of the truck between the seat and the dash be made long enough to bring the seat a considerable distance behind the front wheels, or else that the person entering or leaving the seat climb over one of the front wheels. The first alternative involves a considerable waste of space that could otherwise be utilized for the storage of the goods to be delivered; while the second alternative presents the disadvantage that entrance to the seat is made awkward and even dangerous, by reason of the muddy and slippery condition of the tires and hubs of the wheels in wet weather.

An object of my invention is to provide an arrangement by means of which entrance to the seat of the vehicle may be had from the front end of the vehicle, whereby passage to and from the seat of the vehicle is made natural and easy without the necessity of leaving more space between the seat and the front end of the vehicle than is necessary to accommodate the steering and other control mechanism.

Other objects and advantages of my invention will appear from the subjoined description, taken in connection with the accompanying drawings, in which—

Figure 1:
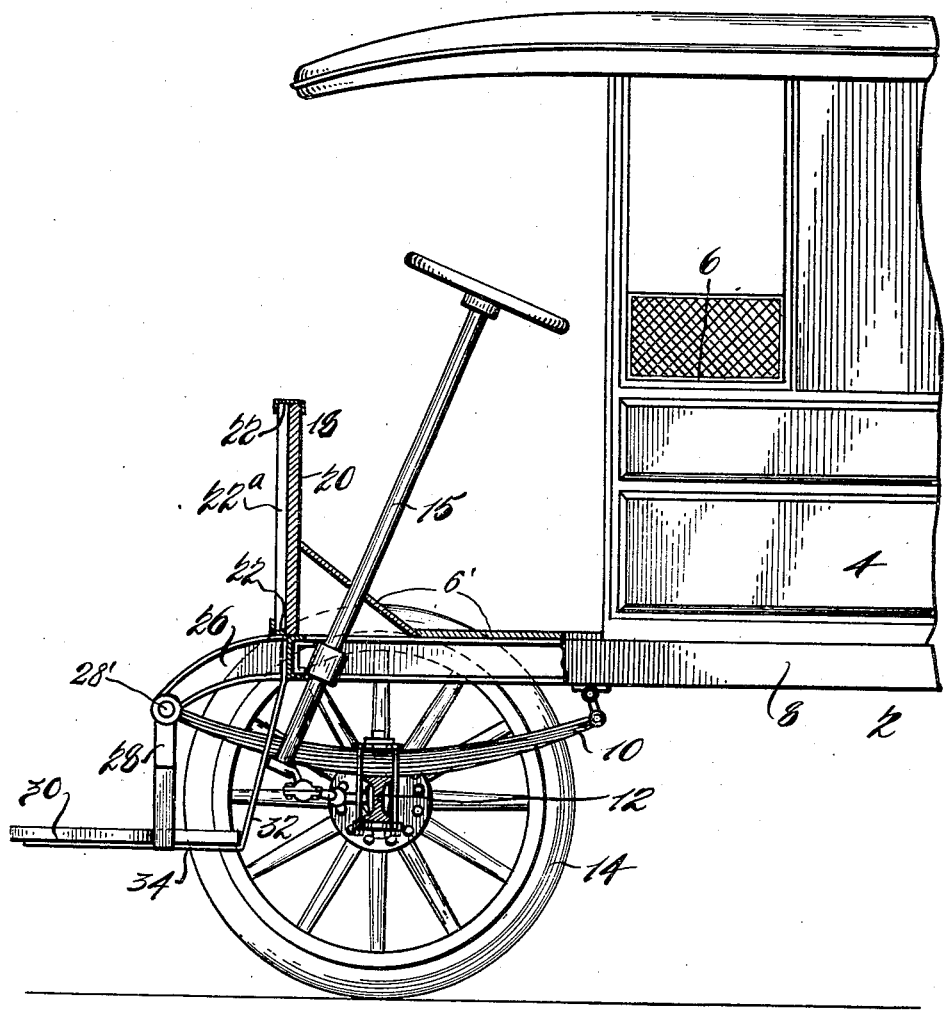
Figure 1 is a side view of the front end of an automobile delivery truck equipped with my invention, the near wheel being removed and parts being in section.
Figure 2:
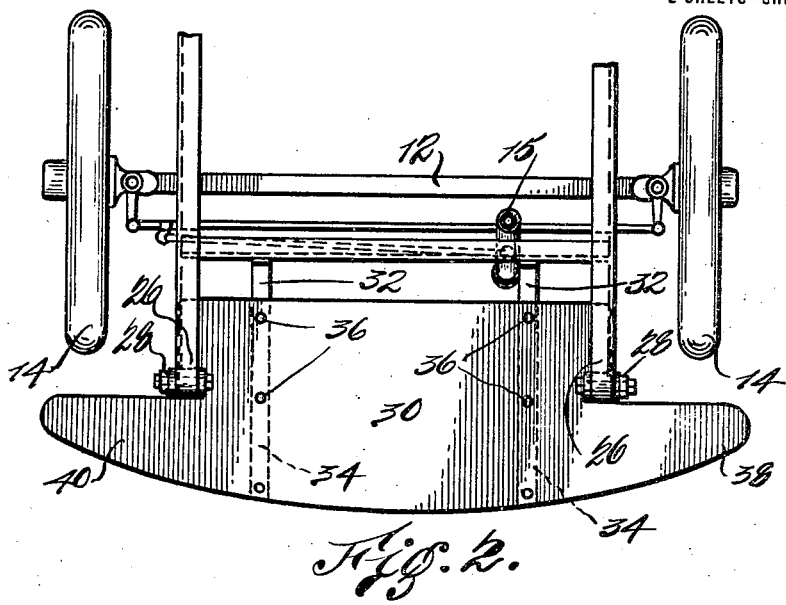
Fig. 2 is a plan view of the combined bumper and step and the adjacent parts of the truck.
Figure 3:
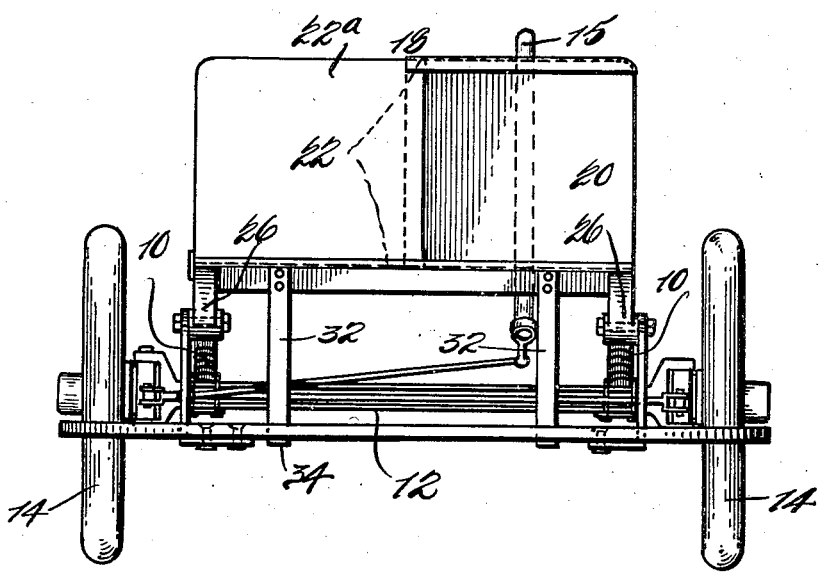
Fig. 3 is an elevational view of the front end of a vehicle equipped with my invention.

In the drawings, I have shown an automobile delivery truck 2, comprising a storage body 4 with a front seat at 6 and a front platform or foot-rest at 6' all carried on the main frame 8. The frame 8 is supported by means of springs 10 on the front axle 12, carrying wheels 14 controlled by the steering column 15. At the front end of the platform 6' and mounted on the frame is a dash 18 comprising a fixed section 20 extending across approximately one-half of said front platform. This fixed section 20 has top and bottom grooves 22 in which is adapted to slide a movable dash section 22ª. The dash section 22ª may be moved to one side, that is, to the right, as shown in Fig. 3, to overlie the fixed section 20. In this relation the sections 20 and 22ª constitute a half dash, that is, a dash extending only half way across the front of the platform, the other half of the front end of the platform being left unobstructed to permit entrance to the vehicle from in front thereof. If the driver alone is to occupy the seat of the vehicle, the section 22ª may be kept in this withdrawn or open position or may even be dispensed with altogether, but if there is an occupant for the left-hand side of the seat, the movable dash section should be slid into closed position as shown in Fig. 3 when the vehicle is in motion. A step member 30 is supported at the front of the vehicle below the main frame 8 preferably by being hung on depending arms or links 28, which are pivoted at their upper ends 28' upon forward extensions 26 of the said frame 8. This step member 30 is in the form of a horizontal platform, as shown in Fig. 2, hung close enough to the ground to make an easy step for a person entering the vehicle and is provided with lateral portions 38 and 40 extending in front of the front wheels to guard the same from collisions. By this construction the step may also constitute a bumper, and in order to serve better this purpose the step member is resiliently mounted so as to cushion a blow when colliding with an obstruction. For this purpose spring braces 32 fastened at their upper ends to a cross member of the frame 8 are secured to the bottom of the step member 30 by horizontal portions 34 and screws 36 so as to resiliently support the step member in its horizontal position.

It will be noted that this construction of step member extending low to the ground and transversely of the vehicle in front of the front wheels constitutes both a cushioning bumper and a step for facilitating the entrance of the driver or passenger from the front of the vehicle to the front platform 6'. This is particularly advantageous in vehicles of the construction herein shown, wherein the front platform 6' is located adjacent and between the front wheels. By the present construction the driver or passenger may enter the platform from the front between the front wheels instead of climbing over the wheels from the side. Of course this entrance to the platform 6' from the front is facilitated by the removal or sliding back of the front dash portion 22ª.

While I have shown and described in detail one form of my invention, it is to be understood that the same is capable of wide variation by the rearrangement of parts or the substitution of equivalents.

What I claim is—

1. A bumper for a vehicle, comprising a cushioned portion projecting from below the frame of said vehicle and hung low enough to the ground to serve as a convenient step for entering the vehicle.

2. In combination with a vehicle, comprising a main frame of depending arms pivotally connected to the front end of said frame, a bumper secured on the lower ends of said arms, and braces connected to said bumper and to the frame of the vehicle.

3. In combination with a vehicle, comprising a main frame of depending arms pivotally connected to the front end of said frame, a bumper secured on the lower ends of said arms, and resilient braces connected to said bumper and to the frame of the vehicle.

4. A combination bumper and step for vehicles comprising a plate pivotally suspended from the frame of the vehicle and extending across the front of the vehicle, and resilient members connected to the plate and the frame of the vehicle for holding the frame in substantially horizontal position.

5. In combination with a vehicle, a combined bumper and step arranged across the front thereof, and a dash comprising a section slidable transversely of said vehicle to permit entrance to the vehicle from the front thereof.

6. In combination with the frame of a vehicle, a bumper suspended by and below the front end of said frame and comprising a horizontal plate extending in front of the wheels and arranged to serve as a step for entering the vehicle, and a dash member on the front end of the frame, said dash member being of a width approximately half of that of the front end of the frame.

7. In a vehicle, a dash comprising a member fixed to the frame of the vehicle on one side of the front end thereof, and a member slidable relatively to said fixed member and arranged to extend across the other side of the front end of the frame or to be withdrawn therefrom.

8. In a vehicle, a dash comprising a slidable section guided transversely from one side across to the other side of said vehicle to permit entrance to the vehicle from the front thereof.

9. The combination with a motor vehicle, of a step member supported below the frame of the vehicle and extending transversely in front of the front wheels of the vehicle, said step member being resiliently mounted to serve as a cushioning bumper for said vehicle.

10. The combination with a motor vehicle, having a front platform adjacent the front wheels of the vehicle, of means for facilitating the entrance to said platform comprising a step member supported below the frame of the vehicle in low enough position to form a convenient step and extending transversely in front of the front wheels of said vehicle, said step member being resiliently mounted to serve as a cushioning bumper for said vehicle.

11. The combination with a motor vehicle, of a step member hung downwardly from the front end of the frame of said vehicle and extending transversely in front of the front wheels of said vehicle, resilient braces at the rear of said step member for connecting the same with the frame of said vehicle whereby said step member may serve as a cushioning bumper for said vehicle.

12. The combination with a motor vehicle, having a front platform located at least partially between the front wheels of said vehicle, and a removable dash portion at the front of said platform, of means facilitating the entrance to said platform from the front of the vehicle, comprising a step member supported below the frame of the vehicle in low enough position to form a convenient step and extending transversely in front of the front wheels of said vehicle, said step member being resiliently mounted to serve as a cushioning bumper for said vehicle.

Signed at Mt. Vernon, N. Y. this 8th day of June, 1917.

CHARLES A. WARD.